(12) United States Patent
Fleig et al.

(10) Patent No.: US 8,544,637 B2
(45) Date of Patent: Oct. 1, 2013

(54) CONTINUOUS CONVEYOR BELT

(75) Inventors: Viola Fleig, Pfeffikon (CH); Edgar Von Gellhorn, Sins (CH); Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 12/666,849

(22) PCT Filed: Jun. 27, 2008

(86) PCT No.: PCT/CH2008/000293
§ 371 (c)(1),
(2), (4) Date: May 11, 2010

(87) PCT Pub. No.: WO2009/003301
PCT Pub. Date: Jan. 8, 2009

(65) Prior Publication Data
US 2010/0230253 A1 Sep. 16, 2010

(30) Foreign Application Priority Data
Jul. 10, 2007 (CH) ....................................... 1117/07

(51) Int. Cl.
B65G 15/42 (2006.01)
(52) U.S. Cl.
USPC .......................................... 198/832; 198/850

(58) Field of Classification Search
None
See application file for complete search history.

(56) References Cited

U.S. PATENT DOCUMENTS

| 2,770,977 | A |   | 11/1956 | Beckadolph et al. |
| 5,498,214 | A | * | 3/1996 | Macchiarulo et al. ........ 474/268 |
| 5,630,500 | A |   | 5/1997 | Conrad |
| 5,662,541 | A |   | 9/1997 | Roovers |
| 5,911,307 | A |   | 6/1999 | Kraft et al. |
| 6,919,122 | B2 | * | 7/2005 | Keese et al. .................... 428/167 |
| 7,980,385 | B2 | * | 7/2011 | Guernsey ...................... 198/850 |

FOREIGN PATENT DOCUMENTS

| WO | 96/15054 A1 | 5/1996 |
| WO | 98/33728 A2 | 8/1998 |
| WO | 03/076311 A1 | 9/2009 |

* cited by examiner

Primary Examiner — Kavel Singh
(74) Attorney, Agent, or Firm — Hodgson Russ LLP

(57) ABSTRACT

A continuous conveyor belt (1) has a transporting side and a driving side (31). Arranged on the driving side (31) are driving ribs (2), spaced evenly apart in the running direction (9) of the conveyor belt and running transversely to the running direction (9) of the conveyor belt. The driving ribs (2) have lateral guiding elements (21) for longitudinally guiding the conveyor belt (1) on teeth of a driving element. These lateral guiding elements (21) are formed in the manner of crests of a wave. This ensures good cleanability.

10 Claims, 4 Drawing Sheets

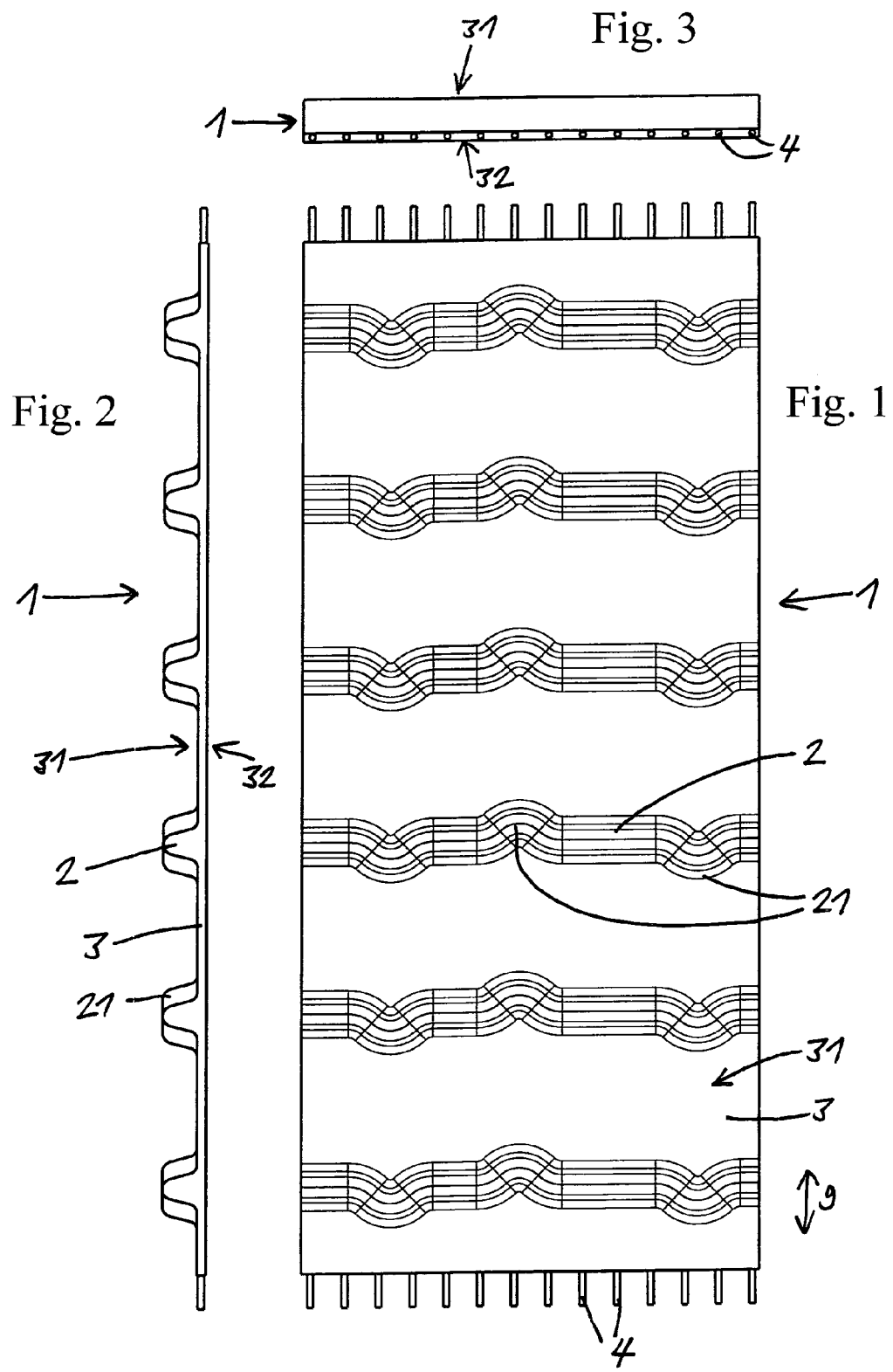

CONTINUOUS CONVEYOR BELT

FIELD OF THE INVENTION

The present invention relates to a continuous conveyor belt with a driving side, on which driving ridges are arranged which are equally spaced apart in the direction of travel of the conveyor belt and run transverse to the direction of travel of the conveyor belt.

BACKGROUND OF THE INVENTION

The most varied types of conveyor belts are utilised today for the transport of foodstuffs. In addition to many other areas of application, these are also used in hygiene sensitive zones. Used in this connection are, for example, plastic layered textile belts, monolithic plastic belts or also modular plastic belts, which consist of a plurality of modules linked together. Since the foodstuffs come directly in contact with the conveyor belts, regular cleaning of the conveyor belts and of other parts of the conveying system is necessary, in order to avoid a contamination of the foodstuffs with old and possibly partly already decomposed remnants of foodstuffs and micro-organisms, like, for example, microbes, bacteria, fungi, yeasts, viruses etc. A good ability to be cleaned is therefore an important requirement for conveyor belts, in particular foodstuff conveyor belts. The conveyor belts, as well as other openly accessible parts of the conveyor system, should be able to be cleaned as well and as quickly as possible with low as possible costs.

In the case of modular belts, the individual modules made from hard plastic as such are normally able to be cleaned well, but in the area of linkage, typically gaps are present, in which foodstuff remnants penetrate and can get caught in, which are then difficult to remove.

With non-modular, continuous conveyor belts no links to connect the belt modules are present, so that no areas of linkage must be cleaned. These continuous conveyor belts are relatively thin and flexibly constructed, such that they can be bent and moved around deflection and driving rollers and toothed wheels respectively.

Such a flexible conveyor belt is known for example from WO 03/076311 A1, that has a smooth conveyor side, as well as a driving side, on which driving ridges are arranged which are equally spaced apart in the direction of travel of the conveyor belt and run transverse to the direction of travel of the conveyor belt. The conveyor belt is guided around driving rollers and is driven via the driving ridges by the driving rollers. In doing so the problem can arise that the conveyor belt displaces laterally on the driving rollers and disconnects from these.

This problem is usually solved by laterally arranging guiding elements next to the conveyor belt, which prevent a lateral displacement of the conveyor belt. Such guiding elements are, for example, guide rails on the conveyor device or also surrounding disks on the driving rollers, which rotate with them, such that the conveyor belt is not slowed down through contact with the guiding elements.

However such guiding elements next to the conveyor belt have the disadvantage that they are additional components, which increase the width of the conveyor device and which must also additionally be cleaned. Furthermore, they can potentially impede the cleaning of the driving rollers.

From U.S. Pat. No. 2,770,977 A it is known to provide driving ridges of a flat belt, which run transverse to the direction of travel of the belt, with longitudinal ridges for longitudinally guiding the belt on teeth of a driving toothed wheel. These longitudinal ridges have the disadvantage that they create corners and angles that are only difficult to clean.

SUMMARY OF THE INVENTION

The object of the present invention is therefore to produce a continuous conveyor belt of the type as mentioned at the beginning, that enables a simple longitudinal guiding of the conveyor belt in a conveyor system that is able to be cleaned well.

The problem of the invention is solved by the continuous conveyor belt according to the invention, as it is defined in patent claim 1. Preferred embodiments are to be found in the dependent claims.

The essence of the invention is as follows: a continuous conveyor belt has a conveyor side and a driving side. Driving ridges are arranged on the driving side, which are equally spaced apart in the direction of travel of the conveyor belt and which run transverse to the direction of travel of the conveyor belt. The driving ridges have lateral guiding elements for longitudinally guiding the conveyor belt on teeth of a driving element. These lateral guiding elements are formed in the shape of wave crests.

Through the fact that the lateral guiding elements on the driving side are integrated in the conveyor belt, they do not increase the width of the conveyor device. The longitudinal guidance of the conveyor belt results from the teeth of a driving element or several driving elements respectively, such that no additional guiding elements are needed outside of the conveyor belt. The wave crest shaped construction of the lateral guiding elements ensures a good ability to be cleaned. As well as a simple longitudinal guidance, they also provide for a centering of the conveyor belt on the teeth of the driving element or driving elements respectively.

For example, a driving toothed wheel, a driving roller or a driving cylinder can serve as a driving element.

Advantageously, lateral guiding elements are present on the conveyor belt, on the front side and the rear side of the driving ridges, in the direction of travel of the conveyor belt. This results, on the front side and the rear side of the driving ridges, in abutting points for the teeth of a driving element or several driving elements respectively. In addition, the conveyor belt is thereby stabilised.

Preferably, the lateral guiding elements on the front side and the rear side of the driving ridges are displaced from each other transverse to the direction of travel of the conveyor belt. Thereby the conveyor belt is not made too stiff locally.

Advantageously, each of the driving ridges are, at least in sections, formed in the shape of waves. Such driving ridges and lateral guiding elements in the shape of waves are not only able to be cleaned well due to their shape, but also are very stable with a low outlay for materials.

In an advantageous embodiment, the driving ridges each have a straight middle section essentially over their whole length. This results overall in a simple and very stable construction.

Preferably, the driving ridges are formed without angles up to their longitudinal ends and have only rounded transitions. The driving ridges are thereby optimally able to be cleaned.

Advantageously, the configuration of the lateral guiding elements of the driving ridges is aligned with the configuration of the teeth of a driving element. This ensures an optimal longitudinal guidance of the conveyor belt.

For an advantageous embodiment, each driving ridge has several lateral guiding elements, which have different distances among themselves. The same conveyor belt is thus usable with different or differently arranged driving elements.

Advantageously, the conveyor belt has predetermined bending sites that are formed thinner between the driving ridges. Such predetermined bending sites increase the flexibility of the conveyor belt and make its bending easier, which enables the use of smaller driving elements and deflection wheels or rollers.

Preferably, the conveyor belt has reinforcing threads in the direction of travel of the conveyor belt. These reinforcing threads are either distributed equally over the whole width of the belt, in order to achieve homogenous belt properties, or placed through a defined inhomogeneous distribution, such that unnecessary reinforcing threads can be saved and that in addition a hygienic flawless cutting of the width of the conveyor belt—without danger of injury of the sealed reinforcing threads—is ensured.

The conveyor belt according to the invention is preferably produced by means of a thermal forming technology, wherein the driving ridges, including the lateral guiding elements and, if need be, reinforcing threads, are incorporated.

BRIEF DESCRIPTION OF THE DRAWINGS

In the following, the conveyor belt according to the invention is described in more detail based on three embodiments with reference to the accompanying figures, which show:

FIG. 1—a top view of a first embodiment of the conveyor belt according to the invention with driving ridges which, in sections, are in the shape of waves;

FIG. 2—a side view of the conveyor belt of FIG. 1;

FIG. 3—a front view of the conveyor belt of FIG. 1;

DETAILED DESCRIPTION OF THE INVENTION

Figure 4:
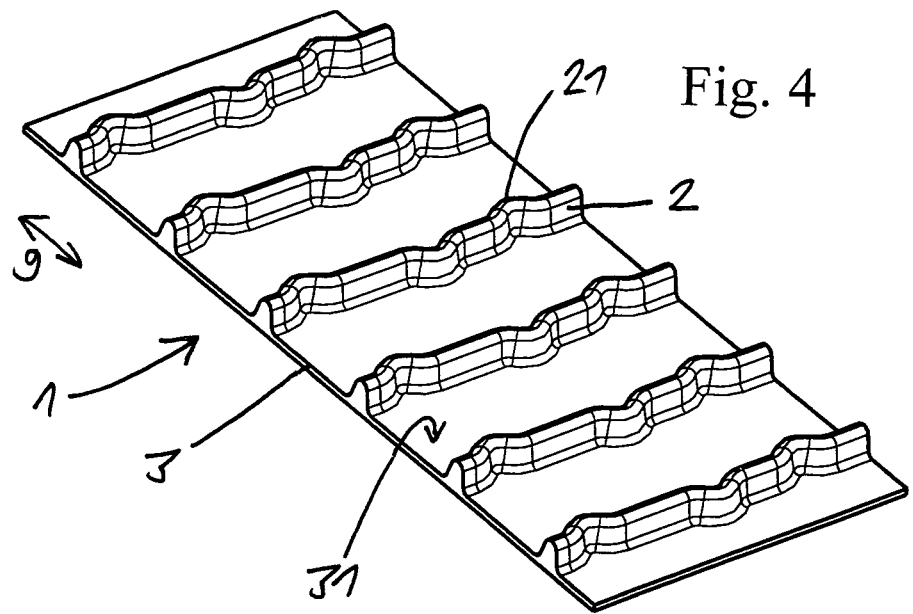
FIG. 4—a perspective view of the conveyor belt of FIG. 1.

The first embodiment of a conveyor belt 1 according to the invention, as presented in FIGS. 1 to 4, comprises a flat base part 3 with a driving side 31 and a conveying side 32, both of which are smoothly formed over large areas, in order to enable it to be cleaned well. The direction of travel of the conveyor belt 1 is indicated with an arrow 9, wherein the conveyor belt 1 can be moved forwards as well as backwards. In conventional applications, the conveyor belt 1 is made endless through connection of both its longitudinal ends.

The base part 3 of the conveyor belt 1 is reinforced in the direction of travel of the conveyor belt with reinforcing threads 4, which are equally distributed over the belt width. These reinforcing threads 4 absorb the attractive forces that are acting on the conveyor belt 1 to a great extent, and ensure that the conveyor belt 1 does not expand too much.

On the driving side 31, a plurality of driving ridges 2 are arranged on the base part 3, which run transverse to the direction of travel of the conveyor belt 9 over the whole width of the conveyor belt 1 and are arranged in constant distances equidistant to each other in the direction of travel of the conveyor belt 9. The driving ridges 2 are wave shaped in sections, wherein the wave crests 21 form lateral guiding elements for longitudinally guiding the conveyor belt 1 on teeth of a driving toothed wheel.

To ease cleaning, the driving ridges 2 are constructed without angles up to their longitudinal ends and have only rounded transitions, which also applies to the transitions in the base part 3. The lines of the driving ridges 2 drawn in FIG. 1, and most of those in FIG. 4, are in reality radius lines that are not visible.

Figure 5:
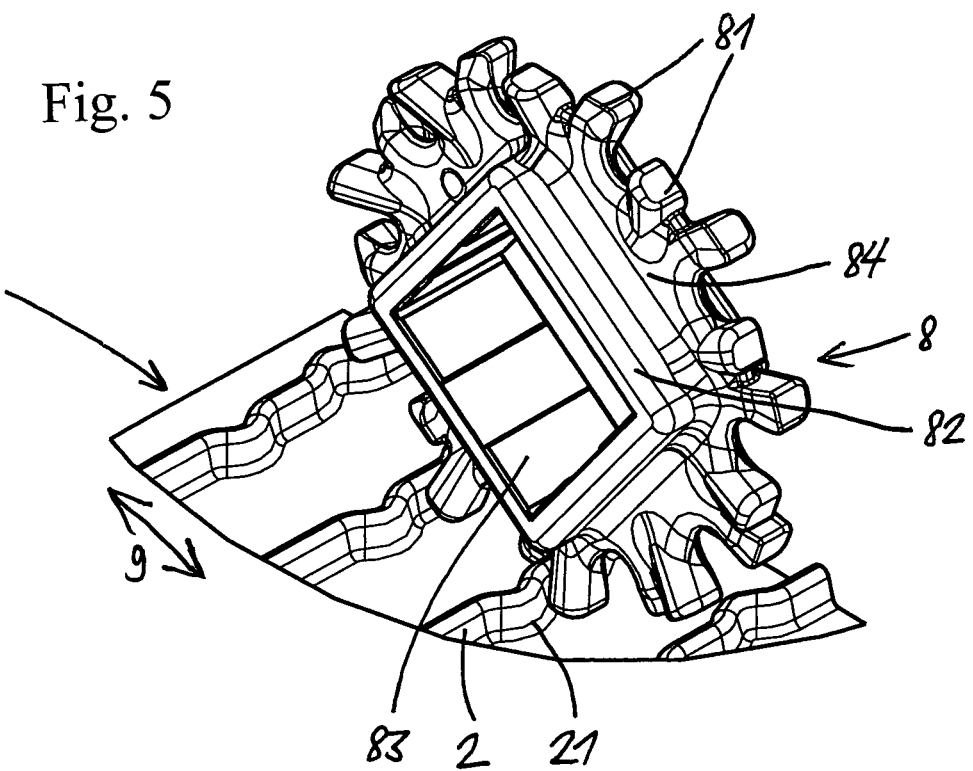
FIG. 5—a driving element in the form of a driving toothed wheel in engagement with a part of the conveyor belt of FIG. 1 in a perspective view.
Figure 6:
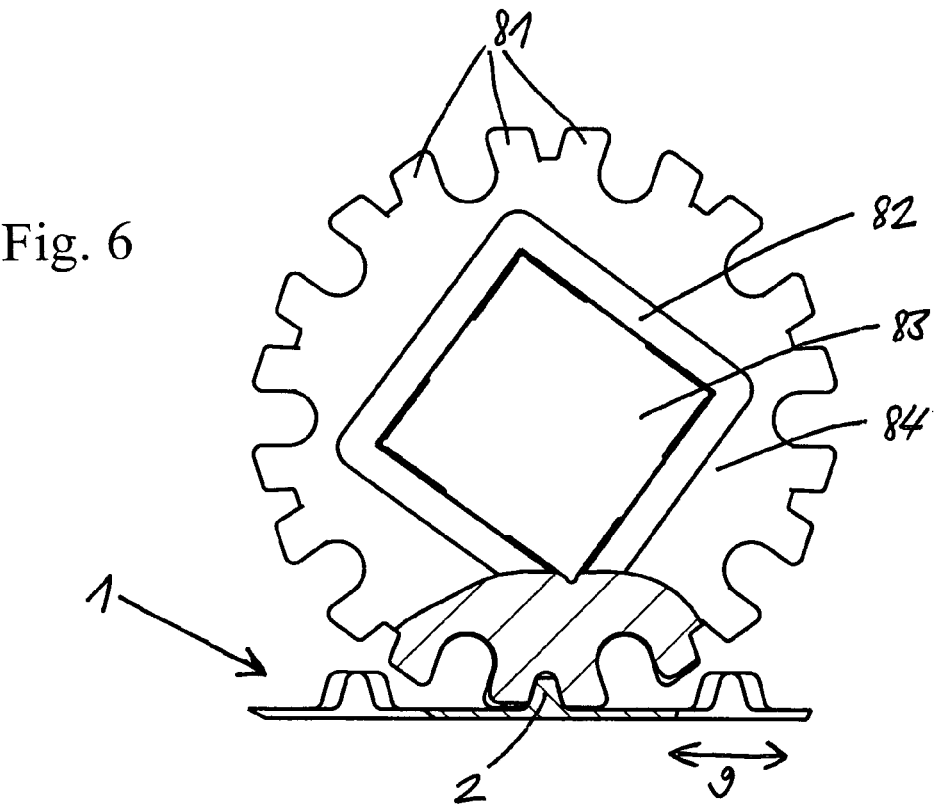
FIG. 6—a partly cut side view of the driving toothed wheel and conveyor belt of FIG. 5.
Figure 7:
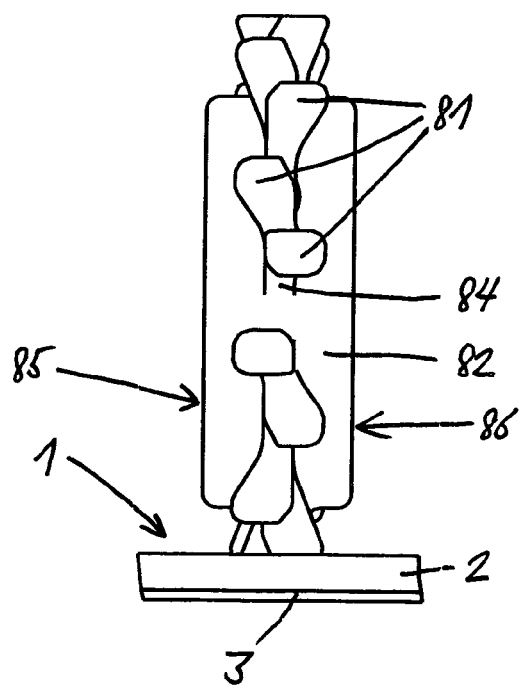
FIG. 7—a front view of the driving toothed wheel and conveyor belt of FIG. 5.

In FIGS. 5 to 7, the engagement of a driving element is presented in the form of a driving toothed wheel 8 in the conveyor belt 1. The driving toothed wheel 8 comprises a hub 82, which is provided with an opening 83, which in cross section is essentially square for reception of a shaft, which in cross section is essentially square. Around the hub 82, a row of teeth 81 extends extensively radially outwards, out from a common ring shaped base 84, wherein the teeth 81 run however slightly inclined to the respective radius line, namely alternatively slanting to the left side 85 and to the right side 86 of the driving toothed wheel 8. Thus practically two rows of teeth 81 result from this inclination of the teeth outwards, which emanate from one single ring shaped base 84.

Like the conveyor belt 1, also the driving toothed wheel 8 is largely without angles for a better ability to be cleaned and rounded transitions are present whenever possible. Most of the lines drawn in FIG. 5, of the driving toothed wheel 8, are in reality radius lines that are not visible.

For driving the conveyor belt 1, the teeth 81 of the driving toothed wheel 8 engage behind the driving ridges 2 of the conveyor belt 1, as is best apparent in FIGS. 5 and 6. Due to the symmetric construction, the conveyor belt 1 is movable forwards as well as backwards in the direction of travel of the conveyor belt 9. Through the inclination of the teeth 81 of the driving toothed wheel 8, the driving force is better distributed and in addition a good ability to be cleaned is ensured.

As is recognisable in FIG. 5, the wave crests 21 of the driving ridges 2 form lateral guiding elements, on which the teeth 81 of the driving toothed wheel 8 laterally rest against to laterally guide the conveyor belt 1. The wave form of these lateral guiding elements 21 produces a centering of the conveyor belt 1 during the driving by the driving toothed wheel 8.

The configuration of the driving toothed wheels 8 of a conveyor system and the distances of the lateral guiding elements 21 (wave crests) on the driving ridges 2 are so aligned with each other, that the conveyor belt 1 is optimally centered and longitudinally guided. Thereby also more lateral guiding elements 21 than in principle necessary can be arranged on the conveyor belt 1 and potentially even in different distances, such that the same conveyor belt 1 is usable with different or differently arranged driving toothed wheels.

Figure 8:
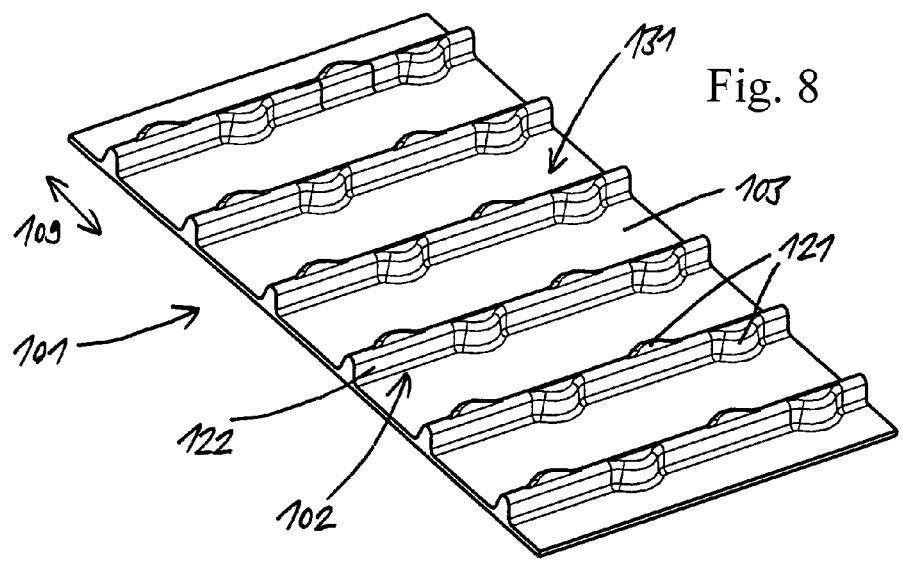
FIG. 8—a perspective view of a second embodiment of the conveyor belt according to the invention with driving ridges with a straight middle section and projections which are in the shape of wave crests on both sides.

FIG. 8 shows a second embodiment of a conveyor belt 101 according to the invention, which comprises a flat base part 103. The direction of travel of the conveyor belt 101 is indicated with an arrow 109, wherein the conveyor belt 101 again can be moved forwards as well as backwards. In conventional applications the conveyor belt 101 is also made endless through connection of both its longitudinal ends.

On the driving side 131 of the conveyor belt 101, a plurality of driving ridges 102 are arranged on the base part 103, which run transverse to the direction of travel of the conveyor belt 109 over the whole width of the conveyor belt 101 and are arranged in constant distances equidistant to each other in the direction of travel of the conveyor belt 109. The driving ridges 102 each have a straight middle section 122 over their whole length, with projections 121 on both sides. The projections 121 are formed in the shape of wave crests and form lateral guiding elements for longitudinally guiding the conveyor belt 101 on teeth of a driving toothed wheel corresponding to the first embodiment.

To ease cleaning, the driving ridges 102 are again formed without angles up to their longitudinal ends and have only rounded transitions, which also applies to the transitions in the base part 103. Most of the lines of the driving ridges 102 drawn in FIG. 8 are in reality radius lines that are not visible.

Figure 9:
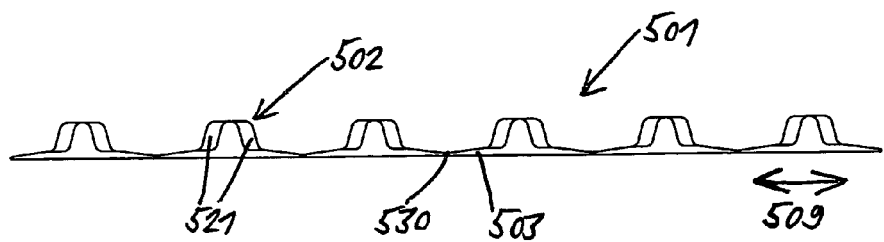
FIG. 9—a side view of a third embodiment of the conveyor belt according to the invention which is similar to the first embodiment, however with predetermined bending sites between the driving ridges which are formed thinner.

A third embodiment of a conveyor belt 501 according to the invention is presented in FIG. 9, which largely corresponds to the first embodiment. The only difference is that the base part 503 has between the driving ridges 502, which comprise the wave crests 521 as lateral guiding elements, predetermined bending sites 530, which are each formed thinner and increase the flexibility of the conveyor belt 501 and facilitate its bending. The direction of travel of the conveyor belt 501 is indicated with an arrow 509, wherein the conveyor belt 501 again can be moved forwards as well as backwards.

Further constructional variations are feasible for the previously described conveyor belts and conveyor systems. The following can be expressly mentioned:

- all these conveyor belts 1, 101 and 501 can be reinforced with reinforcing threads 4 in the longitudinal direction or in the direction of travel of the conveyor belt 9, 109 and 509. These can be equally distributed over the width of the belt, as shown in the first embodiment, in order to achieve homogeneous belt properties. Alternatively the reinforcing threads can also be introduced through a defined inhomogeneous distribution, such that unnecessary reinforcing threads can be saved and that in addition a hygienic flawless cutting of the width of the conveyor belt—without danger of injury of the sealed reinforcing threads—is ensured.
- instead of the driving toothed wheel 8, also other driving toothed wheels, driving rollers or driving cylinders of the most diverse types can be used with the conveyor belts according to the invention.

The invention claimed is:

1. Continuous conveyor belt with a driving side, on which driving ridges are arranged which are equally spaced apart in the direction of travel of the conveyor belt and which run transverse to the direction of travel of the conveyor belt, which have lateral guiding elements for limiting displacement of the conveyor belt in a direction perpendicular to the direction of travel on teeth of a driving element, wherein the lateral guiding elements are formed in the shape of wave crests.

2. Conveyor belt according to claim 1, wherein lateral guiding elements are present on the front side and the rear side of the driving ridges in the direction of travel of the conveyor belt.

3. Conveyor belt according to claim 2, wherein the lateral guiding elements on the front side and the rear side of the driving ridges are displaced from each other transverse to the direction of travel of the conveyor belt.

4. Conveyor belt according to claim 1, wherein each of the driving ridges are, at least in sections, formed in the shape of waves.

5. Conveyor belt according to claim 1, wherein the driving ridges each have a straight middle section essentially over their whole length.

6. Conveyor belt according to claim 1, wherein the driving ridges are formed without angles up to their longitudinal ends and have only rounded transitions.

7. Conveyor belt according to claim 1, wherein the configuration of the lateral guiding elements of the driving ridges is aligned with the configuration of the teeth of a driving element.

8. Conveyor belt according to claim 1, wherein each driving ridge has several lateral guiding elements, which have different distances among themselves.

9. Conveyor belt according to claim 1, wherein between the driving ridges it has predetermined bending sites which are formed thinner.

10. Conveyor belt according to claim 1, wherein it has reinforcing threads in the direction of travel of the conveyor belt.

* * * * *